United States Patent [19]
Kosaka et al.

[11] Patent Number: 5,943,162
[45] Date of Patent: *Aug. 24, 1999

[54] OPTICAL AMPLIFIER, OPTICAL AMPLIFYING METHOD AND OPTICAL TRANSMISSION SYSTEM USING THE OPTICAL AMPLIFIER

[75] Inventors: Junya Kosaka, Fujisawa; Takayuki Suzuki; Hideyuki Kuwano, both of Yokohama, all of Japan

[73] Assignee: Hitachi, Ltd., Tokyo, Japan

[ * ] Notice: This patent is subject to a terminal disclaimer.

[21] Appl. No.: 09/185,095

[22] Filed: Nov. 3, 1998

Related U.S. Application Data

[63] Continuation of application No. 08/833,355, Apr. 4, 1997, Pat. No. 5,835,260.

[30] Foreign Application Priority Data

Apr. 11, 1996 [JP] Japan ................................ 8-89147

[51] Int. Cl.$^6$ ........................................................ H01S 3/00
[52] U.S. Cl. .......................................... 359/341; 359/134
[58] Field of Search ................................... 359/341, 134, 359/133, 122

[56] References Cited

U.S. PATENT DOCUMENTS 5,303,314  4/1994  Duling, III et al. .
5,589,969  12/1996  Taga et al. .
5,696,615  12/1997  Alexander .
5,835,260  11/1998  Kosaka et al. ...................... 359/341

OTHER PUBLICATIONS

"Er:Doped Fiber Amplifier for WDM Transmission Using Fiber Gain Control", Nakabayashi et al, Opto–Electronics Res. Labs., NEC Corporation, The Institute of Electronics Information and Communication Engineers, Technical Report of IEICE, 1994, pp. 31–47.

*Primary Examiner*—Mark Hellner
*Attorney, Agent, or Firm*—Antonelli, Terry, Stout & Kraus, LLP

[57] ABSTRACT

An optical amplifier including an input unit, a polarization maintaining optical amplifying unit, an exciting unit and an output unit. The input unit enables receiving a first signal light in a first polarization state and a second signal light in a second polarization state different from the first polarization state. The polarization maintaining optical amplifying unit includes a polarization maintaining optical amplifying medium enabling receiving the first and second signal lights with the first and second polarization states maintained as they are. The exciting unit provides first and second exiting lights having polarization states corresponding to the first and second lights, respectively, so that the polarization maintaining optical amplifying unit is capable of selectively amplifying the first and second signal lights, and the output unit enables receiving the first and second signal lights after being amplified by the polarization maintaining optical amplifying unit and outputting the amplified first and second signal lights to a transmission line.

13 Claims, 10 Drawing Sheets

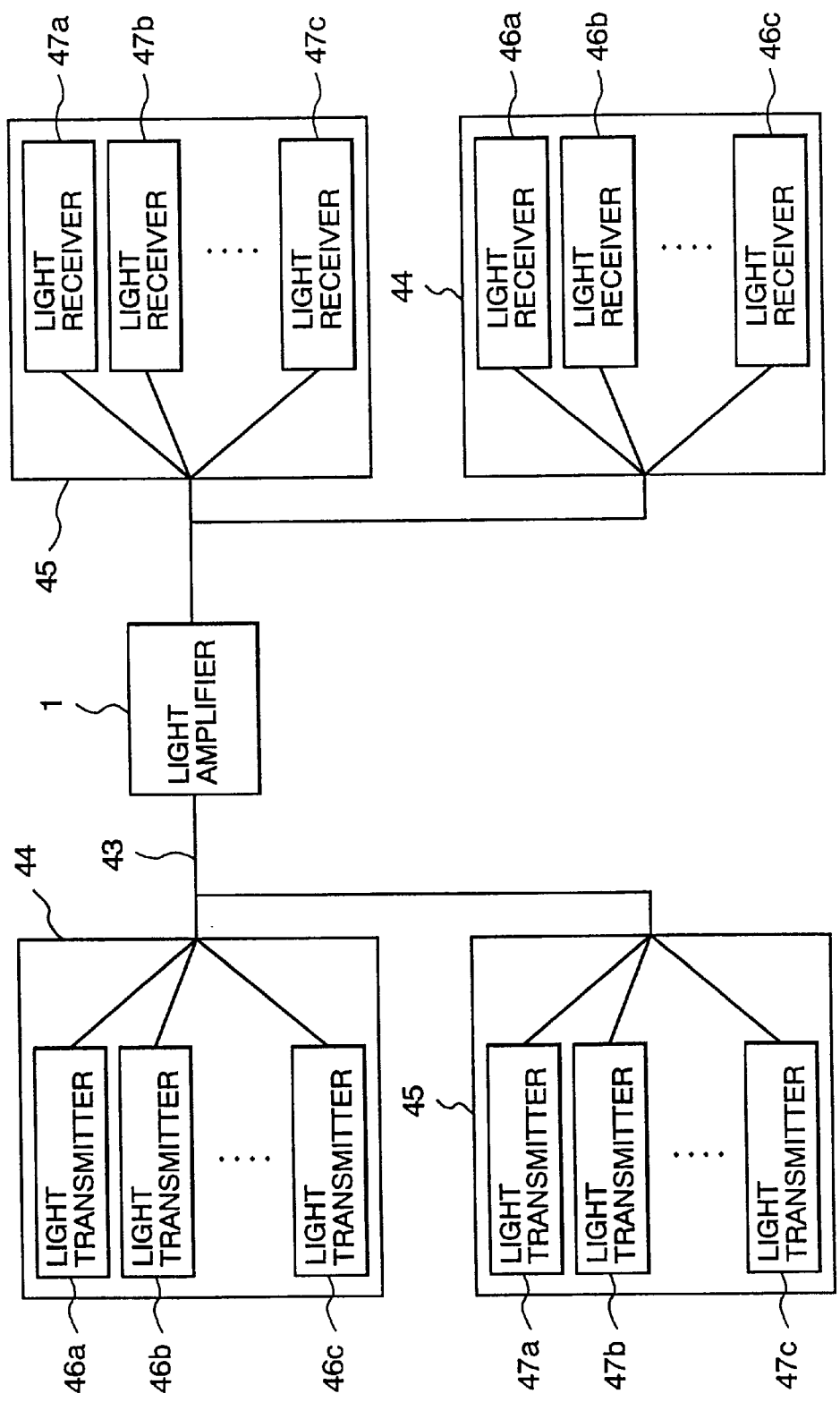

OPTICAL AMPLIFIER, OPTICAL AMPLIFYING METHOD AND OPTICAL TRANSMISSION SYSTEM USING THE OPTICAL AMPLIFIER

CROSS REFERENCE TO RELATED APPLICATION

This is a continuation of U.S. application Ser. No. 08/833,355 now U.S. Pat. No. 5,835,260, filed Apr. 4, 1997, the subject matter of which is incorporated by reference herein.

BACKGROUND OF THE INVENTION

The invention relates to an optical amplifier and an optical amplifying method used in an optical communication system or a long-distance optical transmission system and also relates to an optical transmission system using the optical amplifier.

In response to a demand for reduction of the cost of an optical communication system, a wavelength-division-multiplexed (WDM) transmission is studied. The wavelength-division-multiplexed transmission system is used for transmitting two or more signals with wavelengths different from each other through a single optical transmission optical fiber by using a multiplexing technique. An optical amplifier appropriate for the wavelength-division-multiplexed transmission system must therefore be capable of amplifying a signal to give a high S/N ratio. However, an erbium-doped optical fiber composing an optical amplifier or a semiconductor optical amplifier has a gain which is dependent upon the wavelength, giving rise to deviations in optical power among different wavelengths observed in the optical output or the gain thereof after the amplification. The deviation in optical power among signal lights with different wavelengths is particularly accumulated in a multi-stage relaying process carried out by optical amplifiers. Thus, a big deviation in optical power among different wavelengths is observed in the optical powers of signal lights after the multi-stage relaying process. As a result, the multiplexed signal light having a wavelength with the smallest optical power has a poor S/N ratio which in turn limits the maximum relayed transmission distance of the system as a whole. It is thus important to provide an optical amplifier that has no deviation in optical power among signal lights with different wavelengths.

As a conventional system with no deviation in optical power among signal lights with different wavelengths, there has been studied a system shown in FIG. 1 of a technical report of the IEICE (the Institute of Electronics, Information and Communication Engineers) OCS94-66, OPE94-88 (1994-11) with a title "Er Doped Optical fiber Amplifier for WDM Transmission Using Optical fiber Gain Control." Reference numeral 33 shown in the figure is an erbium-doper optical fiber whereas reference numerals 34 and 35 each denote an optical-optical fiber isolator. Reference numerals 36 and 37 are an optical synthesizer and an exciting optical source respectively. Reference numeral 38 denotes an optical attenuator. Reference numeral 39 is an optical coupler for splitting the output of the optical attenuator 38 and reference numeral 40 is an optical detector for detecting a split signal output by the optical coupler 39. The erbium-doped optical fiber 33, the optical-optical fiber isolators 34 and 35, the optical synthesizer 36, the exciting optical source 37, the optical attenuator 38, the optical coupler 39 and the optical detector form the conventional optical system. In this configuration, the optical fiber gain is controlled to a fixed value of 12 dB (with a power deviation among input signal lights with wavelengths of 1,548 nm, 1,551 nm, 1,554 nm and 1,557 nm set at 0 dB) by using an automatic optical-fiber-gain controller (AFGC) in order to minimize the deviation in optical power among signal lights with different wavelengths. In addition, the optical attenuator 38 is used as an automatic power controller (APC) to adjust the optical loss while maintaining the optical fiber gain at the fixed value of 12 dB so that the optical fiber-gain spectrum does not change even if the relay-amplification degree is varied.

In a real system, it is not necessarily possible to make the relay-transmission distance constant due to, among other things, conditions at the locations of relay stations. In the wavelength-division-multiplexed transmission, non-linear optical effects occurring in the course of transmission result in optical loss which is different from wavelength to wavelength and it is thus quite within the bounds of possibility that the deviation in input power is observed at the input of an optical amplifier due to a long transmission distance traveled by the signal lights.

In the conventional system, multiplexed signal lights are amplified uniformly by an exciting light source. Thus, if a deviation in input power among signal lights having the four wavelengths of the signal light is generated, the deviation in output level among signal lights having the wavelengths can not be corrected. As described above, the deviation in optical power among signal lights with different wavelengths is particularly accumulated in a multi-stage relaying process carried out by optical amplifiers. Thus, a big deviation in optical power among signal lights with different wavelengths is observed in the optical powers of the signal lights after the multi-stage relaying process. As a result, the multiplexed signal light having a wavelength with the smallest optical power has a poor S/N ratio which in turn limits the maximum relayed transmission distance of the system as a whole. That is to say, the relay-transmission distance must be shortened.

In addition, when a signal light of the multiplexed signal having one or the four wavelengths has fluctuations in power, it is impossible to suppress the fluctuations of only the signal light of a wavelength with a fluctuating power. Further, even though the automatic power controller (APC) or the automatic optical fiber gain controller (AFGC) is used in the conventional system to apply fixed control to all the multiplexed signal lights having the four wavelengths, it is quite within the bounds of possibility that fluctuations occurring in a signal light having one of the four wavelengths are dispersed to the signal lights having the other wave-lengths.

In an actual transmission system, on the other hand, in order to improve the reliability of the system as a whole or to increase the transmission capacity, in general, it is necessary to provide a spare transmission system or to build parallel transmission systems.

With the conventional technology, only a single transmission system is taken into consideration. If n parallel transmission systems are to be built, the cost of the required optical amplifiers is also multiplied n times. As a result, the total cost of the actual system is increased.

SUMMARY OF THE INVENTION

It is a first object of the present invention to provide an optical amplifier capable of carrying out individual control of a plurality of signal lights, with their polarization states discriminatable from each other, independently of each other.

It is a second object of the present invention to provide an optical amplifier which, by carrying out individual control of signal lights, with their polarization states discriminatable from each other, transmitted through a plurality of transmission lines independently of each other, allows a cost of addition of system series to be reduced.

It is a third object of the present invention to provide a simple and efficient optical amplifier using a polarization maintaining optical amplifying medium.

It is a fourth object of the present invention to provide an optical amplifier which, after carrying out individual control of a plurality of signal lights, with their polarization states discriminatable from each other, independently of each other, splits and outputs the signal lights to a plurality of transmission lines and is thus capable of keeping up with addition and elimination of system series.

It is a fifth object of the present invention to provide an optical amplifier capable of keeping up with variations along the time axis occurring in individual signal lights independently of each other.

It is a sixth object of the present invention to provide an optical amplifier which is capable of keeping up with variations along the time axis occurring in individual signal lights independently of each other and outputs the signal lights to transmission lines with their polarization states maintained as they are so as to allow system series to be deleted.

It is a seventh object of the present invention to provide a low-cost optical amplifier utilizing characteristics of an optical amplifying medium.

It is an eighth object of the present invention to provide an optical amplifier capable of independently controlling the output of a signal light having a single wavelength by considering the wavelength dependence observed in the gains of wavelength-division-multiplexed signal lights.

It is a ninth object of the present invention to provide an optical transmission system which, by carrying out individual control of a plurality of signal lights, with their polarization states discriminatable from each other, independently of each other by using a single optical amplifier, allows the system cost to be reduced and the relay-transmission distance to be increased.

It is a tenth object of the present invention to provide an optical amplifier which, by carrying out individual control of a plurality of signal lights transmitted in both directions, with their polarization states discriminatable from each other, independently of each other, allows the system cost to be reduced.

It is an eleventh object of the present invention to provide an optical amplification method capable of carrying out individual control of a plurality signal lights transmitted through a plurality of transmission lines, with their polarization states discriminatable from each other, independently of each other.

In order to achieve the first object described above, the present invention provides an optical amplifier comprising:

an input unit for providing a first signal light in a first polarization mode (polarization state) and a second signal light in a second polarization mode different from the first polarization mode;

a polarization maintaining optical amplifying unit having a polarization maintaining optical amplifying medium for receiving the first and second signal lights and amplifying the first and second signal lights with the polarization modes maintained as they are so that the signal lights can be controlled independently of each other, with their polarization states discriminatable from each other;

an exciting unit which is used for providing first and second exciting lights having polarization modes corresponding to the first and second signal lights respectively so that the polarization maintaining optical amplifying unit is capable of selectively amplifying the first and second signal lights; and an output unit for receiving the first and second signal lights after being amplified by the polarization maintaining optical amplifying unit and outputting the amplified first and second signal lights to a transmission line.

In order to achieve the second object described above, the present invention provides an optical amplifier comprising:

an input unit connected to at least two transmission lines for receiving at least a first signal light in a first polarization state and a second signal light in a second polarization state different from the first polarization state from the transmission lines wherein a polarized-wave identifying unit is used for discriminating the polarized waves of the first and second signal lights from each other and a polarized-wave synthesizing unit is used for synthesizing the first and second signal lights having discriminatable polarized waves with the first and second polarization states thereof maintained as they are;

a polarization maintaining optical amplifying unit including a polarization maintaining optical amplifying medium for receiving the first and second signal lights and amplifying the first and second signal lights with the first and second polarization states maintained as they are;

an exciting unit which is used for providing at least first and second exciting lights having polarization states corresponding to the first and second signal lights respectively so that the polarization maintaining optical amplifying unit is capable of selectively amplifying the first and second signal lights; and an output unit for receiving the first and second signal lights after being amplified by the polarization maintaining optical amplifying unit and outputting the amplified first and second signal lights to a transmission line.

In order to achieve the third object described above, the present invention provides an optical amplifier wherein the polarized-wave identifying unit further comprises a first polarizer which is used for polarizing the first signal light into a plane of polarization and a second polarizer for polarizing the second signal light into a plane of polarization orthogonal to the plane of polarization of the first signal light so that the first and second signal lights can be discriminated from each other with a high degree of reliability.

In order to achieve the fourth object described above, the present invention provides an optical amplifier wherein the output unit further comprises a polarized-wave separating unit for discriminating the polarized waves of the first and second signal lights amplified by the polarization maintaining optical amplifying unit from each other and separating the first and second signal lights from each other and output ports for receiving the first and second signal lights separated by the polarized-wave separating unit and outputting the first and second signal lights to transmission lines.

In order to achieve the fifth object described above, the present invention provides an optical amplifier wherein the output unit further comprises:

a polarized-wave separating unit for discriminating the polarized waves of the first and second signal lights amplified by the polarization maintaining optical amplifying unit from each other and separating the first and second signal lights from each other;

a branching unit for passing on the first and second signal lights separated by the polarized-wave separating unit and letting some of the first and second signal lights separated by the polarized-wave separating unit branch;

a detecting unit for detecting the powers of the first and second signal lights branching at the branching unit; and a controller which is used for receiving detection outputs from the detecting unit and controlling the first and second exciting lights so that the first and second signal lights supplied to the output unit are maintained at predetermined levels.

In order to achieve the sixth object described above, the present invention provides an optical amplifier wherein the output unit further comprises:

a branching unit for passing on the first and second signal lights amplified by the polarization maintaining optical amplifying unit and letting some of the first and second signal lights branch with the polarization states thereof maintained as they are;

a polarized-wave separating unit for discriminating the polarized waves of the first and second signal lights branching at the branching unit from each other and separating the first and second signal lights from each other;

a detecting unit for detecting the powers of the first and second signal lights separated by the polarized-wave separating unit; and a controller which is used for receiving detection outputs from the detecting unit and controlling the first and second exciting lights so that the first and second signal lights output to the output unit are maintained at predetermined levels.

In order to achieve the seventh object described above, the present invention provides an optical amplifier wherein the first and second exciting lights generated by the exciting unit are switched from one to another on the time axis and output to the (EDF) rare earth-doped optical fiber in order to independently assign the first and second exiting lights to the first and second signal lights respectively. It should be noted that, if the polarization maintaining optical amplifying medium is a polarization maintaining erbium-doped optical fiber, it is desirable to have the first and second exciting lights switched from one to another on the time axis at a frequency of 10 kHz or higher.

In order to achieve the eighth object described above, the present invention provides an optical amplifier comprising:

an optical coupler for splitting wavelength-division-multiplexed signal lights into two signal lights;

a first filter for receiving one of the split lights output by the optical coupler and passing only a signal light having a first wavelength;

a second filter for receiving the other one of the split lights output by the optical coupler and passing only a signal light having a second wavelength different from the first wavelength;

a first polarizer for receiving the signal light with the first wavelength passing through the first filter and polarizing the signal light into a first signal light in a first discriminatable polarization state;

a second polarizer for receiving the signal light with the second wavelength passing through the second filter and polarizing the signal light into a second signal light in a second discriminatable polarization state different from the first discriminatable polarization state;

a synthesizer for synthesizing the first signal light output by the first polarizer and the second signal light output by the second polarizer with the polarization states thereof maintained as they are;

a first polarization maintaining optical fiber for receiving the first and second signal lights synthesized by the synthesizer and transmitting the first and second signal lights with the first and second polarization states thereof maintained;

a polarization maintaining optical amplifying unit having a polarization maintaining optical amplifying medium for receiving the first and second signal lights transmitted from the first polarization maintaining optical fiber and amplifying the first and second signal lights with the first and second polarization states thereof maintained as they are;

an exciting unit which is used for generating first and second exciting lights with polarization states matching those of the first and second signal lights respectively so that the polarization maintaining optical amplifying unit is capable of selectively amplifying the first and second signal lights;

a second polarization maintaining optical fiber for receiving the first and second signal lights amplified by the polarization maintaining optical amplifying unit and transmitting the first and second signal lights with the first and second polarization states thereof maintained; and an output unit for receiving the first and second signal lights after being amplified by the polarization maintaining optical amplifying unit and outputting the amplified first and second signal lights to a transmission line.

In order to achieve the ninth object described above, the present invention provides an optical transmission system comprising transmission lines along which a plurality of signal lights propagate in the same traveling direction and optical amplifying units inserted along the transmission lines, the optical transmission system further comprising:

a transmitting unit for transmitting the signal lights;

a polarized-wave identifying unit for discriminating the polarized wave of a first signal light in a first polarization state from the polarized-wave of a second signal light in a second polarization state different from the first polarization state out off the signal lights;

a polarization maintaining optical amplifying unit for controlling and amplifying the powers of the first and second signal lights output by the polarized-wave identifying unit at values independent of each other by using a single polarization maintaining optical amplifying medium;

an exciting unit which is used for providing first and second exciting lights having polarization states corresponding to the first and second signal lights respectively so that the polarization maintaining optical amplifying unit is capable of selectively amplifying the first and second signal lights; and a receiving unit for receiving the first and second signal lights after being amplified by the polarization maintaining optical amplifying unit.

As an alternative, the present invention provides an optical transmission system comprising transmission lines along which signal lights propagate in directions opposite to each other and optical amplifying units inserted along the transmission lines, the optical transmission system further comprising:

first and second receiving/transmitting units each for receiving and transmitting the signal lights in directions opposite to each other;

first and second polarized-wave identifying units each for discriminating the polarized wave of a first signal light in a first polarization state from the polarized-wave of a second signal light traveling in a direction opposite to a direction of the first signal light in a second polarization state different from the first polarization state coming from the first and second receiving/transmitting units;

a polarization maintaining optical amplifying unit for controlling and amplifying the powers of the first and second signal lights output by the polarized-wave identifying units at values independent of each other by using a single polarization maintaining optical amplifying medium; and an exciting unit which is used for providing first and second exciting lights having polarization states corresponding to the first and second signal lights respectively so that the polarization maintaining optical amplifying unit is capable of selectively amplifying the first and second signal lights.

In order to achieve the tenth object described above, the present invention provides an optical amplifier to be inserted on a transmission line for carrying out bi-directional transmission comprising:

a polarization maintaining optical amplifier unit having a polarization maintaining optical amplifying medium for amplifying a first signal light in a first polarization state and a second signal light traveling in a direction opposite to a direction of the first signal light in a second polarization state different from the first polarization state with the first and second polarization states maintained as they are;

a first input/output port for inputting the first signal light from the transmission line and outputting the second signal light to the transmission line;

a second input/output port for inputting the second signal light from the transmission line and outputting the first signal light to the transmission line;

a first polarized-wave identifying/synthesizing unit comprising a first polarized-wave identifying unit for identifying the polarized wave of the first signal light coming from the first input/output in the first polarization state and a first detour path for causing the second signal light amplified by the polarization maintaining optical amplifier unit to detour the first polarized-wave identifying unit and leading the second signal light to the first input/output port;

a second polarized-wave identifying/synthesizing unit comprising a second polarized-wave identifying unit for identifying the polarized wave of the second signal light coming from the second input/output in the second polarization state and a second detour path for causing the first signal light amplified by the polarization maintaining optical amplifier unit to detour the second polarized-wave identifying unit and leading the first signal light to the second input/output port; and an exciting unit which is used for providing first and second exciting lights having polarization states corresponding to the first and second signal lights respectively so that the polarization maintaining optical amplifying unit is capable of selectively amplifying the first and second signal lights.

In order to achieve the eleventh object described above, the present invention provides an optical amplification method capable of selectively amplifying first and second signal lights, the optical amplification method comprising the steps of:

synthesizing the first signal light in a first polarization state and the second signal light in a second polarization state different from the first polarization state with the first and second polarization states maintained as they are;

providing first and second exciting lights having polarization states corresponding to the first and second signal lights respectively so as to allow the first and second signal lights to be selectively amplified and amplifying the first and second signal lights with the first and second polarization states maintained as they are; and transmitting the amplified first and second signal lights.

BRIEF DESCRIPTION OF THE DRAWINGS

The above and other objects, features as well as many of attendant advantages of the present invention will be readily appreciated as the same becomes better understood by reference to the following figures showing preferred embodiments of the present invention wherein:

FIG. 10 is diagram showing an optical transmission system provided by the present invention.

DETAILED DESCRIPTION OF THE PREFERRED EMBODIMENTS

Figure 1:
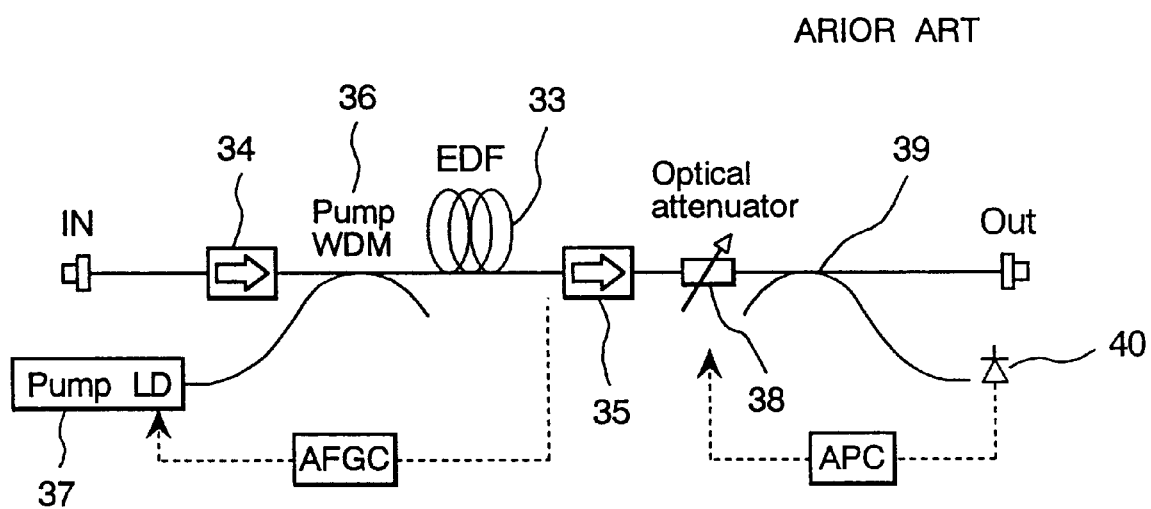
FIG. 1 is a diagram showing the conventional optical amplifier.
Figure 2:
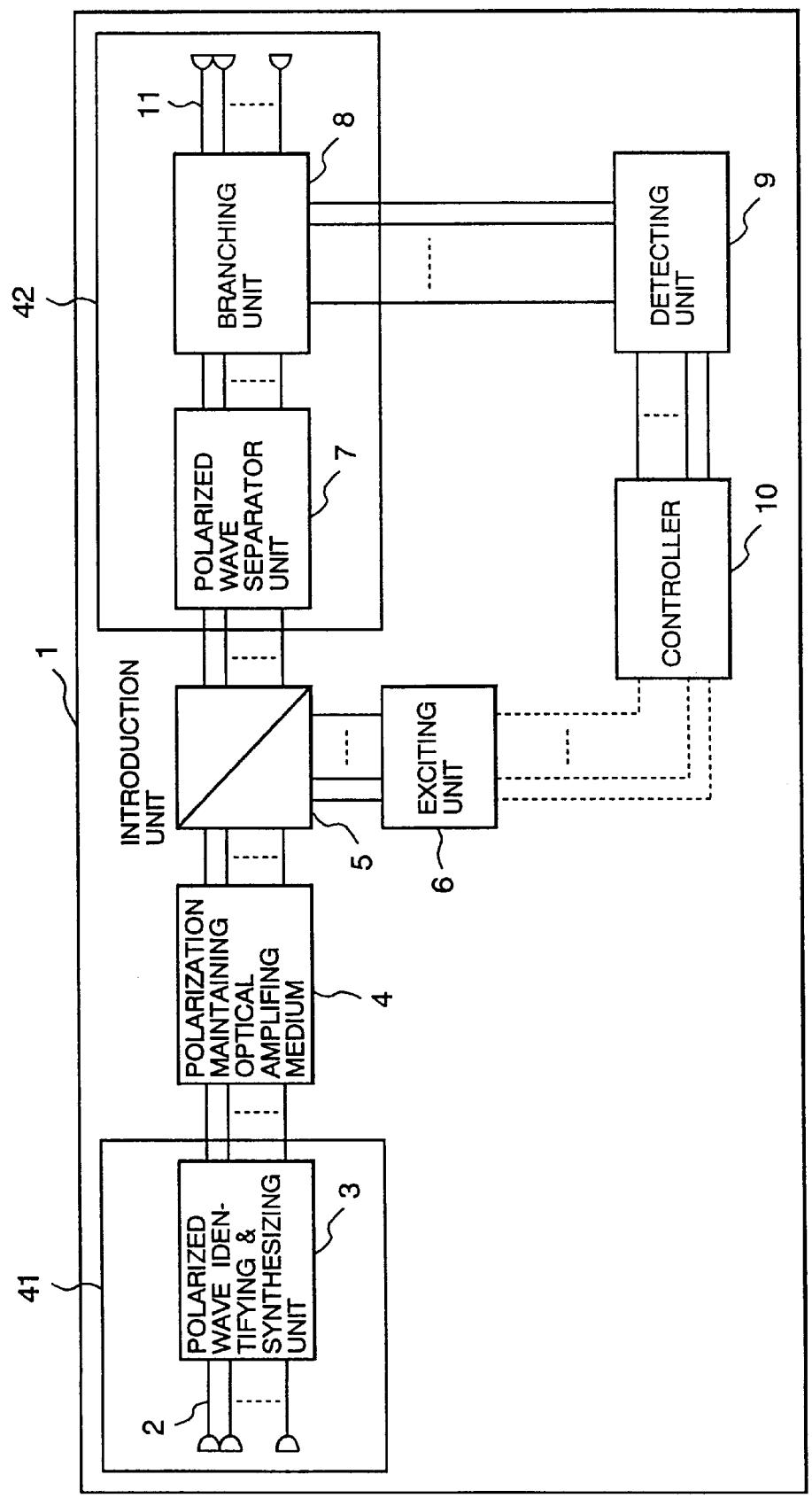
FIG. 2 is a diagram showing a typical basic configuration of an optical amplifier provided by the present invention.

The present invention will become more apparent from the following detailed description of some preferred embodiments with reference to the accompanying diagrams showing the embodiments. FIG. 2 is a diagram showing a typical basic configuration of an optical amplifier provided by the present invention, a typical embodiment for solving the problems described above. Reference numerals 1 and 2 shown in the figure are an optical amplifier and an input port for receiving a transmitted signal light respectively. Reference numeral 3 denotes a polarized-wave identifying/synthesizing unit and reference numeral 4 is a polarization maintaining optical amplifying medium. Reference numeral 5 and 6 are an introduction unit and an exciting unit respectively. Reference numeral 7 is a polarized-wave separating unit. Reference numeral 8 denotes a branching unit and reference numeral 9 is a detection unit. Reference numerals 10 and 11 denote a controller and an output port respectively. Reference numeral 41 is an input unit and reference numeral 42 denotes an output unit.

The operation of the optical amplifier shown in the figure is explained as follows. First of all, a transmitted signal light or transmitted signal lights from a transmission optical fiber or a plurality of parallel transmission optical fibers are introduced by way of a transmitted-signal-light input port 2 or a plurality of transmitted-signal-light input ports 2 to the polarized-wave identifying/synthesizing unit 3 for synthesizing the signal lights into signal lights with their polarization states dicriminatable from each other for one or more output ports. The signal lights with dicriminatable polarization states are then supplied to the polarization maintaining optical amplifying medium 4 for optically amplifying the signal lights with their polarization states maintained as they are. The polarization maintaining optical amplifying medium 4 is excited by the exciting unit 6 for selectively exciting the signal lights by using exciting lights introduced by way of the introduction unit 5. The amplified signal lights are then supplied to the polarized-wave separating unit 7 by way of the introduction unit 5. It should be noted that the direction of introduction of the exciting lights for the signal lights is not limited to that shown in FIG. 2. The polarization states of the optically amplified signal lights coming from the polarization maintaining optical amplifying medium 4 are identified by the polarized-wave separating unit 7 and the signal lights are separated from each other thereby before being supplied to the branching unit 8 for splitting them. Some of the lights split by the branching unit 8 are supplied to the detection unit 9 for monitoring the split lights. The split lights are then supplied to the controller 10 for controlling the exciting unit 6 so as to adjust the amplified signal lights to predetermined values. Most of the signal lights generated by the branching unit 8 are supplied to one output port 11 or a plurality of output ports 11 which finally forward the signal lights to a transmission optical fiber or a plurality of parallel transmission optical fibers.

According to the configuration described above, the polarized-wave identifying/synthesizing unit 3 makes the polarization states of the individual transmitted signals conveying pieces of information different from each other discriminatable from each other as well as maintainable before supplying them to the polarization maintaining optical amplifying medium 4 which is excited by the exciting unit 6 through the introduction unit 5. The polarization maintaining optical amplifying medium 4 optically amplifies the individual signal lights on a selection basis by maintaining their polarization states so that the polarization states remain discriminatable from each other even after being exited by the exciting unit 6. The polarization states of the optically amplified signal lights coming from the polarization maintaining optical amplifying medium 4 are identified by the polarized-wave separating unit 7, allowing the signal lights to be separated from each other thereby in order to restore the individual transmitted signal lights having the original pieces of information. The separated signal lights are each split by the branching unit 8 for supplying some of the separated signal lights to the controller 10 for controlling the exciting unit 6 by way of the detection unit 9 for monitoring the split lights in a feedback control mechanism. With the configuration described above, signal lights with different wavelengths in wavelength-division-multiplexed transmission or different signal lights transmitted in parallel can be controlled independently of each other by means of a single optical amplifier.

Figure 3:
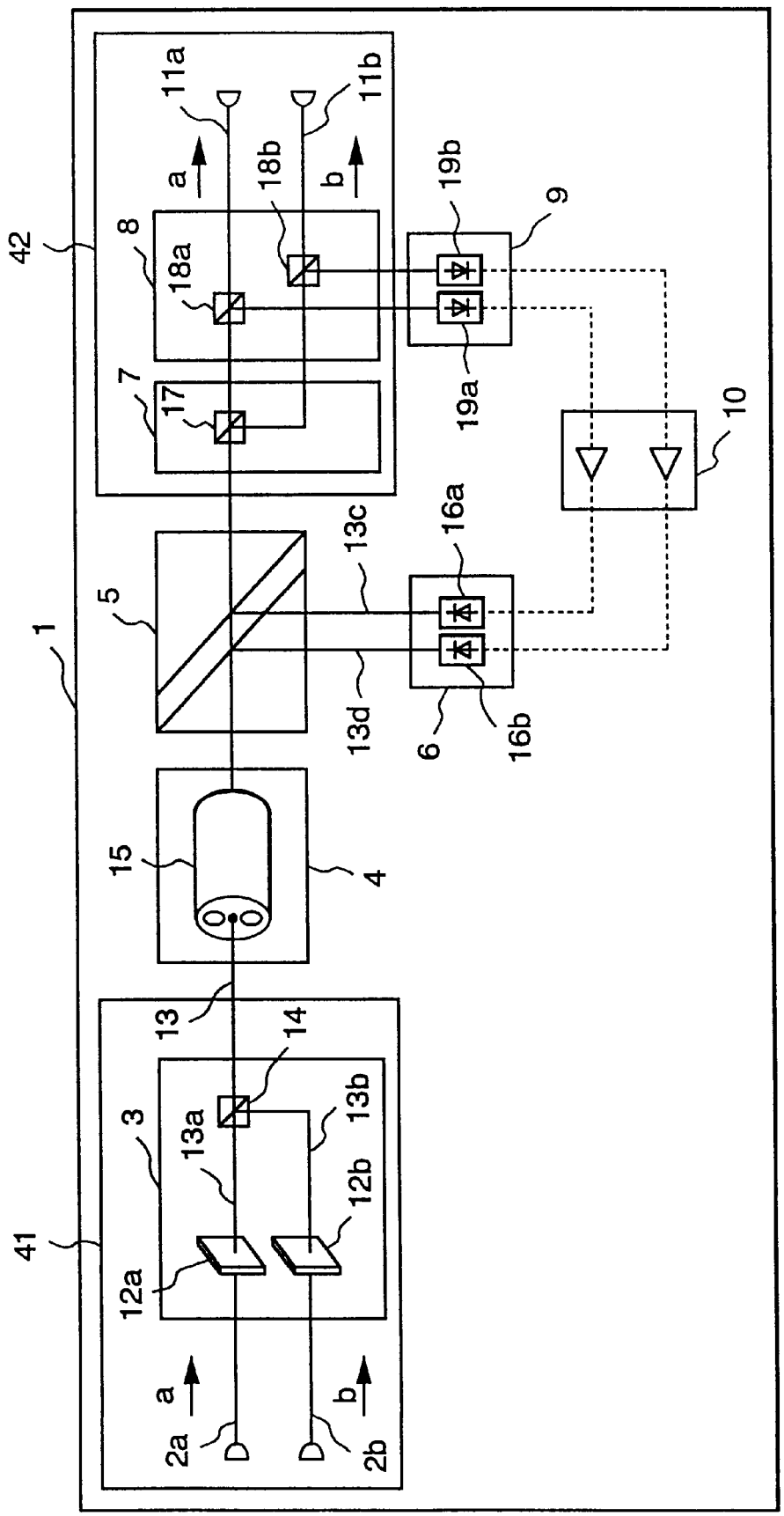
FIG. 3 is a diagram showing a first embodiment implementing an optical amplifier provided by the present invention.

FIG. 3 is a diagram showing a first embodiment implementing an optical amplifier provided by the present invention. Reference numeral 1 shown in the figure is the optical amplifier provided by the present invention. As shown in the figure, the optical amplifier comprises two input ports 2a and 2b connected to two parallel transmission optical fibers respectively and two output ports 11a and 11b. Signal lights a and b coming from the input ports 2a and 2b respectively are supplied to the polarized-wave identifying/synthesizing unit 3. In the polarized-wave identifying/synthesizing unit 3, the signal lights a and b are supplied to polarizers 12a and 12b respectively for polarizing the signal lights a and b into mutually orthogonal polarization states. The signal lights a and b are then supplied to two input ports of a polarized-wave synthesizer 14 by way of polarization maintaining optical fibers 13a and 13b respectively for transmitting the signal lights a and b with their polarization states maintained as they are. In the polarized-wave synthesizer 14, the signal lights a and b are synthesized with their polarization states maintained as they are before being output to a polarization maintaining optical fiber 13 by way of the only output port of the polarized-wave synthesizer 14. In this way, the polarized-wave identifying/synthesizing unit 3 discriminates signal lights introduced thereto from each other by polarization and outputs them with their identified polarization states maintained as they are.

Figure 4:
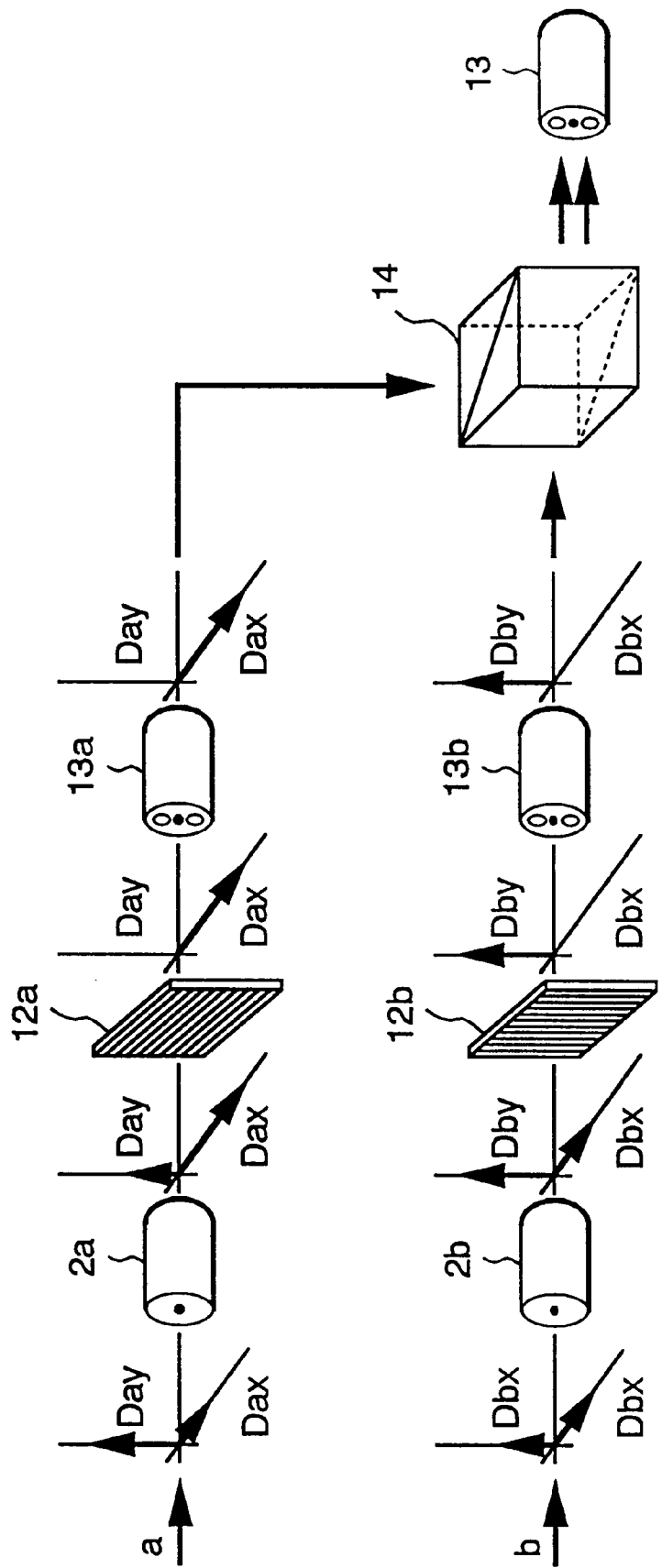
FIG. 4 is a diagram showing the operation of the first embodiment implementing an optical amplifier provided by the present invention.

The operations carried out by the polarized-wave identifying/synthesizing unit 3 are explained in more detail by referring to FIG. 4. Normally, a single-mode transmission optical fiber used in an optical transmission system has two polarization states with mutually orthogonal planes of polarization. In the course of optical transmission, mode transformation may occur, causing the plane of polarization to change the orientation thereof with the lapse of time. For example, let the signal light at the input port 2a be in arbitrary polarization states Dax and Day while the signal light at the input port 2b be in arbitrary polarization states Dbx and Dby. The polarizer 12a plays a role of passing only a signal light in a specific polarization state, that is, the polarization state Dax shown in FIG. 4. Similarly, the polarizer 12b plays a role of passing only a signal light in a specific polarization state, that is, the polarization state Dbx shown in the figure. As a result, the planes of polarization of the signal lights passing through the polarizers 12a and 12b are mutually orthogonal. The signal lights are supplied to the polarized-wave synthesizer 14 for synthesizing the two signal lights having different polarization states by way of the polarization maintaining optical fibers 13a and 13b respectively which are each capable of transmitting a signal light with the polarization state thereof maintained as it is. In the polarized-wave synthesizer 14, the two signal lights are synthesized with their identified polarized states maintained as they are, that is, with the with mutually orthogonal planes of polarization maintaining their orientations. The polarization maintaining optical fiber 13 in use here is also capable of transmitting two signal lights with their mutually orthogonal planes of polarization maintained as they are. It should be noted that a 50:50 polarization maintaining coupler can also be used as a substitute for the polarized-wave synthesizer 14. Signal lights having mutually orthogonal planes of polarization from the beginning can also be supplied to the input ports 2a and 2b respectively. In this case, the polarizers 12a and 12b are not required.

The synthesized signal lights output by the polarized-wave identifying/synthesizing unit 3 are introduced to one end of a polarization maintaining erbium-doped optical fiber 15 serving as the polarization maintaining optical amplifying medium 4 with their mutually orthogonal polarized waves maintained as they are. At the same time, exciting lights from semiconductor lasers 16a and 16b serving as the exciting unit 6 are introduced from the other end of the polarization maintaining erbium-doped optical fiber 15 by way of the introduction unit 5. Polarization maintaining optical fibers 13c and 13d and a polarization maintaining optical synthesizer used as the introduction unit 5 make the polarized waves of the exciting lights mutually orthogonal and make the orientations of the polarized waves of the exciting lights match those of the polarized waves of the signal lights introduced from the other end of the polarization maintaining erbium-doped optical fiber 15. Here, the oscillation wavelength of the semiconductor lasers 16a and 16b is 1.48 microns. It should be noted that the exciting unit 6 can also be connected to the front end of the polarization maintaining erbium-doped optical fiber 15 through the introduction unit 5. As an alternative, exciting units 6 can also be connected to the front and rear ends of the polarization maintaining erbium-doped optical fiber 15 each through an introduction unit 5.

The conventional erbium-doped optical fiber is capable of providing a gain amplification degree independent of the polarized wave. None the less, a single erbium-doped optical fiber is not capable of adjusting the amplification degree to different signal components coexisting in the same optical fiber. On the other hand, with the polarization maintaining erbium-doped optical fiber 15 provided by the present invention to serve as the polarization maintaining optical amplifying medium 4, typically, the exciting light generated by the semiconductor laser 16a contributes only to the excitation amplification of the signal light a while the exciting light generated by the semiconductor laser 16b contributes only to the excitation amplification of the signal light b, allowing a mutually independent amplification operations to be carried out. That is to say, the single polarization maintaining erbium-doped optical fiber 15 is capable of adjusting the gain amplification degrees in a completely independent manner for two signal lights with wavelengths different from each other. In order to utilize the polarization maintaining erbium-doped optical fiber 15 provided by the present invention in a more effective way, it is important that the amount of radiation loss of a light caused by a bent optical fiber be suppressed. Such radiation loss may reduce the gain amplification degrees of the two signal lights with wavelengths different from each other. For this reason, in the present embodiment, the diameter of curvature of the polarization maintaining erbium-doped optical fiber 15 is made not smaller than 300 mm.

After being introduced into the polarization maintaining erbium-doped optical fiber 15, the two signal lights are supplied to a polarized-wave separator 17 used as the polarized-wave separating unit 7 through another polarization maintaining optical fiber 13. The polarized-wave separator 17 again separates the two signal lights from each other back into the two original signal lights which are supplied respectively to optical couplers 18a and 18b used as the branching unit 8. Most of the signal lights are output by the optical couplers 18a and 18b to the output ports 11a and 11b respectively. However, some of them branch at the branching unit 8, entering optical receivers 19a and 19b which serve as the optical detection unit 9 for detecting the powers of the signal lights. The detected powers of the lights are supplied to the controller 10 for controlling the output powers of the semiconductor lasers 16a and 16b so that the signal lights supplied to the output unit are maintained at predetermined levels. To be more specific, typically, the light power detected by the optical receiver 19a for the signal light a is used for controlling the output power of the semiconductor laser 16a. By the same token, the light power detected by the optical receiver 19b for the signal light b is used for controlling the output power of the semiconductor laser 16b.

According to the present embodiment, a single optical amplifier 1 is capable of amplifying two signal lights, allowing the configuration thereof to be made simple. In addition, according to the present embodiment, even if, by any chance, the semiconductor laser 16a deteriorates, putting the system for the signal light a in a down state, the system series for the signal light b excited by the semiconductor laser 16b is capable of functioning normally in a manner completely independent of the system for the signal light a. This capability holds true of the opposite condition. That is to say, the inventor thinks of a transmission system of redundancy wherein, typically, the series for transmitting the signal light a is used as a main signal transmitting series while the series for transmitting the signal light b is used as a spare one in order to further enhance the system reliability. The present invention can also be applied to a case in which a signal with multiplexed wavelengths or a plurality of signal lights superposed on each other are transmitted through a single transmission optical fiber without causing any problems related to the characteristics of the present invention.

As described above, in the present embodiment, the number of parallel transmission optical fibers is two. It should be noted, however, that while the present invention has been described with reference to the first illustrative embodiment, the description is not intended to be construed in a limiting sense. That is to say, it is to be understood that the subject matter encompassed by the present invention is not limited to the first embodiment. For example, the present invention can also be applied to more than two parallel transmission optical fibers for transmitting as many signal lights as the optical fibers. In addition, by merely adding the number of maintainable polarization states of the polarization maintaining erbium-doped optical fiber 15 or the polarization maintaining optical fiber 13 and adding the number or polarized waves each having a maintainable polarization state, it is possible to provide a optical amplifier with a simple configuration that can be adapted to a parallel transmission system.

Figure 5:
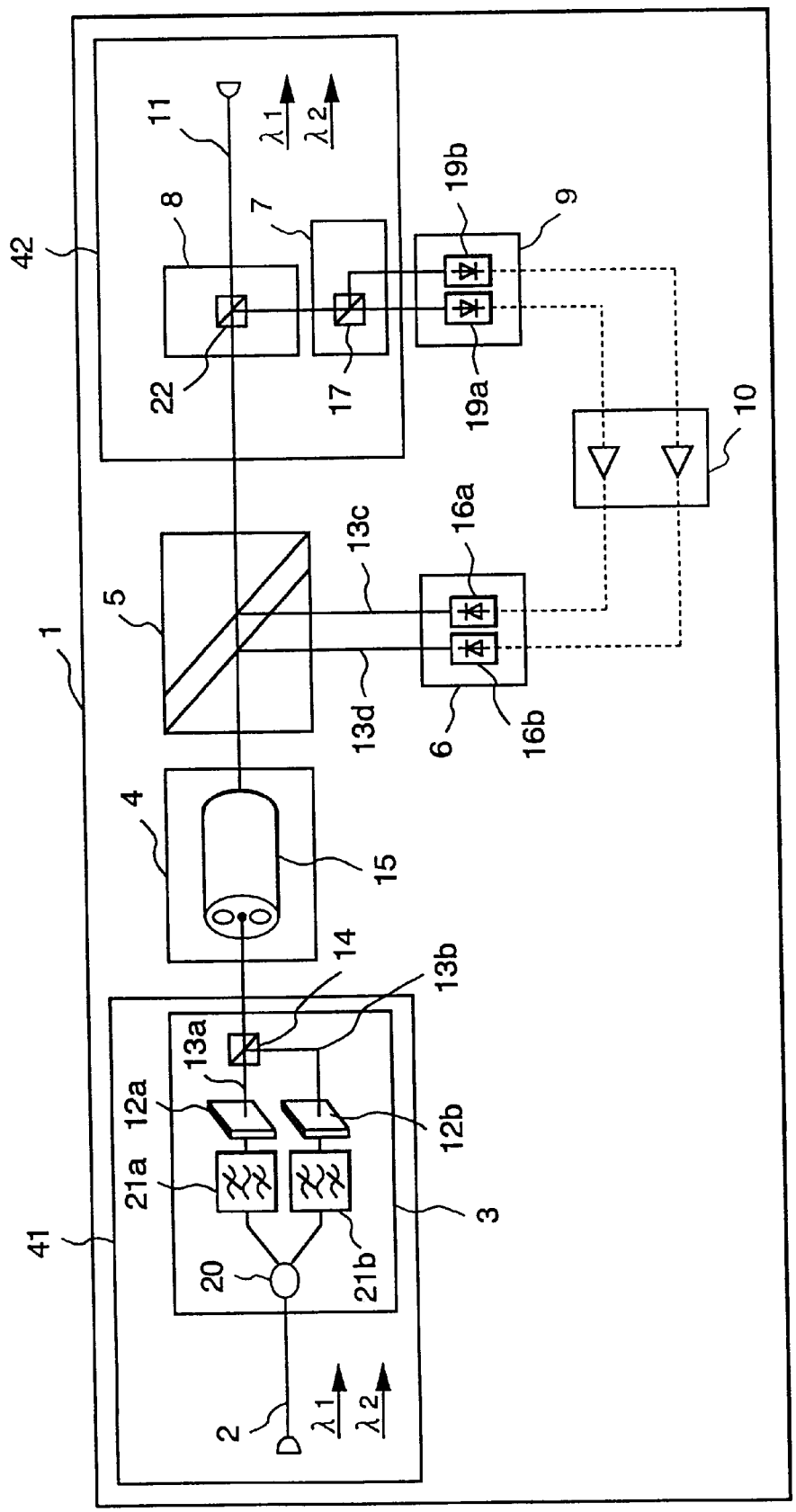
FIG. 5 is a diagram showing a second embodiment implementing an optical amplifier provided by the present invention.

FIG. 5 is a diagram showing a second embodiment of the optical amplifier provided by the present embodiment. Two signal lights transmitted by a transmission optical fiber have multiplexed wavelengths LAMDA1 of 1,550 nm and LAMDA2 of 1,552 nm. Reference numeral 1 shown in the figure is the optical amplifier provided by the present invention similar to that provided by the first embodiment. As shown in the figure, however, the optical amplifier comprises only one input port 2 connected to a parallel transmission optical fiber and one output port 11. A wavelength-division-multiplexed signal light coming from the input port 2 is supplied to the polarized-wave identifying/synthesizing unit 3. In the polarized-wave identifying/synthesizing unit 3 of the second embodiment, the signal light is split by a 50:50 optical coupler 20 into two signal lights. One of the split signal light is supplied to an optical filter 21a having a wavelength pass band of 1,550±1 nm. The optical filter 21a passes on only a signal light a with a wavelength of 1,550 nm. By the same token, the other split signal light is supplied to an optical filter 21b having a wavelength pass band of 1,552±1 nm. The optical filter 21b passes on only a signal light b with a wavelength of 1,552 nm. The signal lights leaving the optical filters 21a and 21b are supplied to polarizers 12a and 12b respectively for polarizing the signal lights a and b into lights with mutually orthogonal polarization states. The signal lights a and b are then supplied to two input ports of a polarized-wave synthesizer 14 by way of polarization maintaining optical fibers 13a and 13b respectively for transmitting the signal lights a and b with their polarization states maintained as they are. In the polarized-wave synthesizer 14, the signal lights a and b are synthesized with their polarization states maintained as they are before being output to a polarization maintaining optical fiber 13 by way of the only output port of the polarized-wave synthesizer 14. The 50:50 optical coupler 20 and the optical filters 21a and 21b can be replaced by an optical wavelength division demultiplexer for producing the split signal lights with wavelengths of 1,550 and 1,552 nm respectively. In this case, the configuration of the polarized-wave identifying/synthesizing unit 3 can be made simpler. Signal lights having mutually orthogonal planes of polarization from the beginning can also be supplied to the input port 2. In this case, the 50:50 optical coupler 20, the optical filters 21a and 21b and the polarizers 12a and 12b are not required.

The signal lights output by the polarized-wave identifying/synthesizing unit 3 are introduced to one end of a polarization maintaining erbium-doped optical fiber 15 serving as the polarization maintaining optical amplifying medium 4 with their mutually orthogonal polarized waves maintained as they are. At the same time, exciting lights from semiconductor lasers 16a and 16b serving as the exciting unit 6 are introduced from the other end of the polarization maintaining erbium-doped optical fiber 15 by way of the introduction unit 5. Polarization maintaining optical fibers 13c and 13d and a polarization maintaining optical synthesizer used as the introduction unit 5 make the polarized waves of the exciting lights mutually orthogonal and make the orientations of the polarized waves of the exciting lights match those of the polarized waves of the signal lights introduced from the other end of the polarization maintaining erbium-doped optical fiber 15. Here, the oscillation wavelength of the semiconductor lasers 16a and 16b is 1.48 microns. It should be noted that the exciting unit 6 can also be connected to the front end of the polarization maintaining erbium-doped optical fiber 15 through the introduction unit 5. As an alternative, exciting units 6 can also be connected to the front and rear ends of the polarization maintaining erbium-doped optical fiber 15 each through an introduction unit 5.

The conventional erbium-doped optical fiber is capable of providing a gain amplification degree independent of the polarized wave. None the less, a single erbium-doped optical fiber is not capable of adjusting the amplification degree to different signal components coexisting in the same optical fiber. On the other hand, with the polarization maintaining erbium-doped optical fiber 15 provided by the present invention to serve as the polarization maintaining optical amplifying medium 4, typically, the exciting light generated by the semiconductor laser 16a contributes only to the excitation amplification of the signal light having a wavelength of 1,550 nm while the exciting light generated by the semiconductor laser 16b contributes only to the excitation amplification of the signal light with a wavelength of 1,552 nm, allowing a mutually independent amplification operations to be carried out. That is to say, the single polarization maintaining erbium-doped optical fiber 15 is capable of adjusting the gain amplification degrees in a completely independent manner for two signal lights with wavelengths different from each other. In order to utilize the polarization maintaining erbium-doped optical fiber 15 provided by the present invention in a more effective way, it is important that the amount of radiation loss of a light caused by a bent optical fiber be suppressed. As described above, such radiation loss may reduce the gain amplification degrees of the two independent signal lights. For this reason, in the present embodiment, the diameter of curvature of the polarization maintaining erbium-doped optical fiber 15 is made not smaller than 300 mm as is the case with the first embodiment.

After being introduced into the polarization maintaining erbium-doped optical fiber 15, the two signal lights are supplied to a 5:95 polarization maintaining optical coupler 22 used as the branching unit 8 through another polarization maintaining optical fiber 13. Most of the signal lights leaving the 5:95 polarization maintaining optical coupler 22 are output to the output port 11. However, some of them branch at the 5:95 polarization maintaining optical coupler 22, entering a polarized-wave separator 17 used as the polarized-wave separating unit 7 for separating the two signal lights from each other back into the two original signal lights which are supplied respectively to optical receivers 19a and 19b. The optical receivers 19a and 19b serve as the optical detection unit 9 for detecting the powers of the signal lights. The detected powers of the signal lights are supplied to the controller 10 for controlling the output powers of the semiconductor lasers 16a and 16b so that the signal lights supplied to the output unit are maintained at predetermined levels. To be more specific, typically, the light power detected by the optical receiver 19a for the signal light with a wavelength of 1,550 nm is used for controlling the output power of the semiconductor laser 16a. By the same token, the light power detected by the optical receiver 19b for the signal light with a wavelength of 1,552 nm is used for controlling the output power of the semiconductor laser 16b.

With the present embodiment, it possible to control components of a wavelength-division-multiplexed signal light independently of each other by using an optical amplifier having a simple configuration.

In the present embodiment, the degree of wavelength multiplexity is 2. It should be noted, however, that by increasing the number of branches of the optical coupler 20, adding new polarization maintaining erbium-doped optical fibers 15 in parallel to the existing one and synthesizing the split signal lights at a stage before the output port 11, the present invention can also be applied to a wavelength-division-multiplexed signal light with a greater degree of wavelength multiplexity. The degree of wavelength multiplexity of a signal light can also be increased by increasing the degree of wavelength multiplexity of the optical filter 21a or 21b and identifying the components of the wavelength-division-multiplexed signal light. In addition, by adding the number of maintainable polarization states in the polarization maintaining erbium-doped optical fiber 15 and in the polarization maintaining optical fiber 13, the number of polarized waves each having a maintainable polarization can be increased, making it possible to provide a optical amplifier with a simple configuration adaptable to a wavelength-division-multiplexed system. In this way, by combining the parallel transmission system provided by the first embodiment and the wavelength-division-multiplexed system provided by the second embodiment, an optical amplifier can be implemented by a single transmission optical fiber, allowing the system configuration to be made simple and, thus, the system cost to be reduced.

Figure 6:
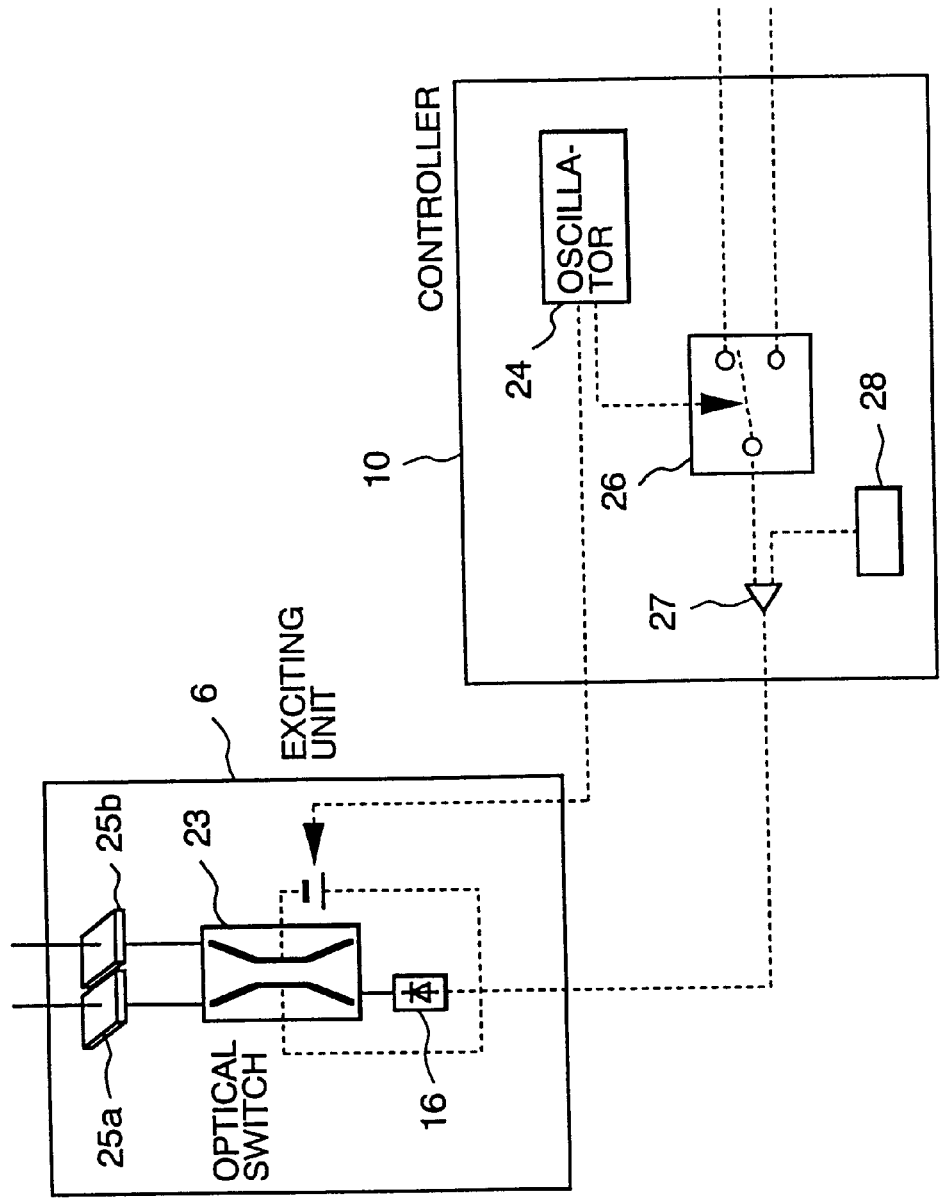
FIG. 6 is a diagram showing other examples of an exciting means and a control apparatus.
Figure 7:
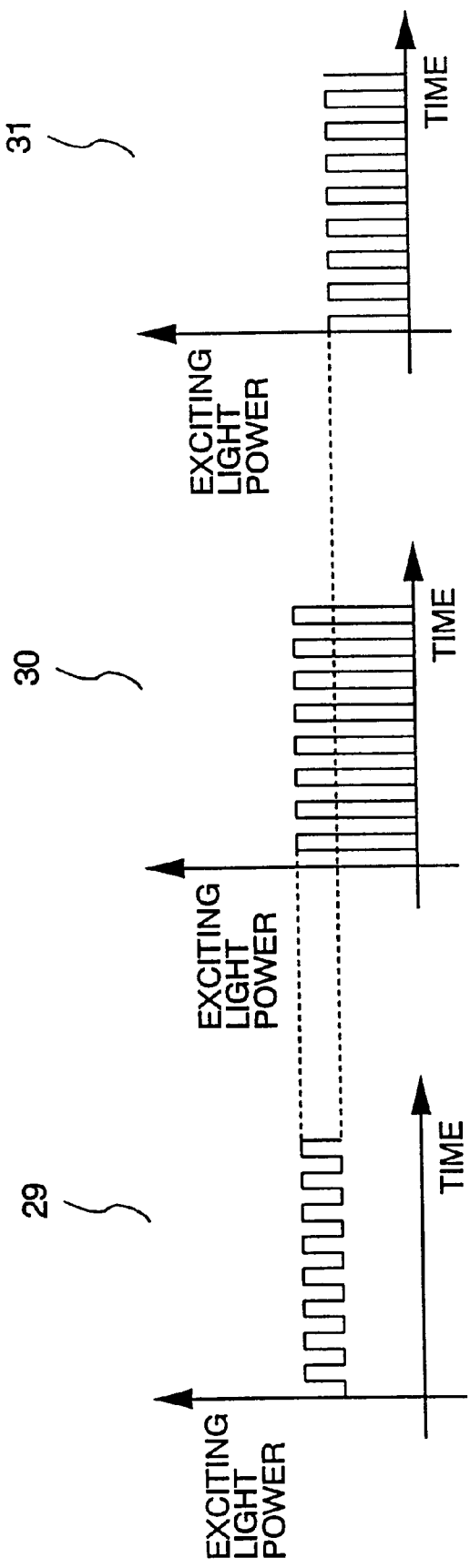
FIG. 7 is a diagram showing graphs representing a model of operating states of an exciting light.
Figure 8:
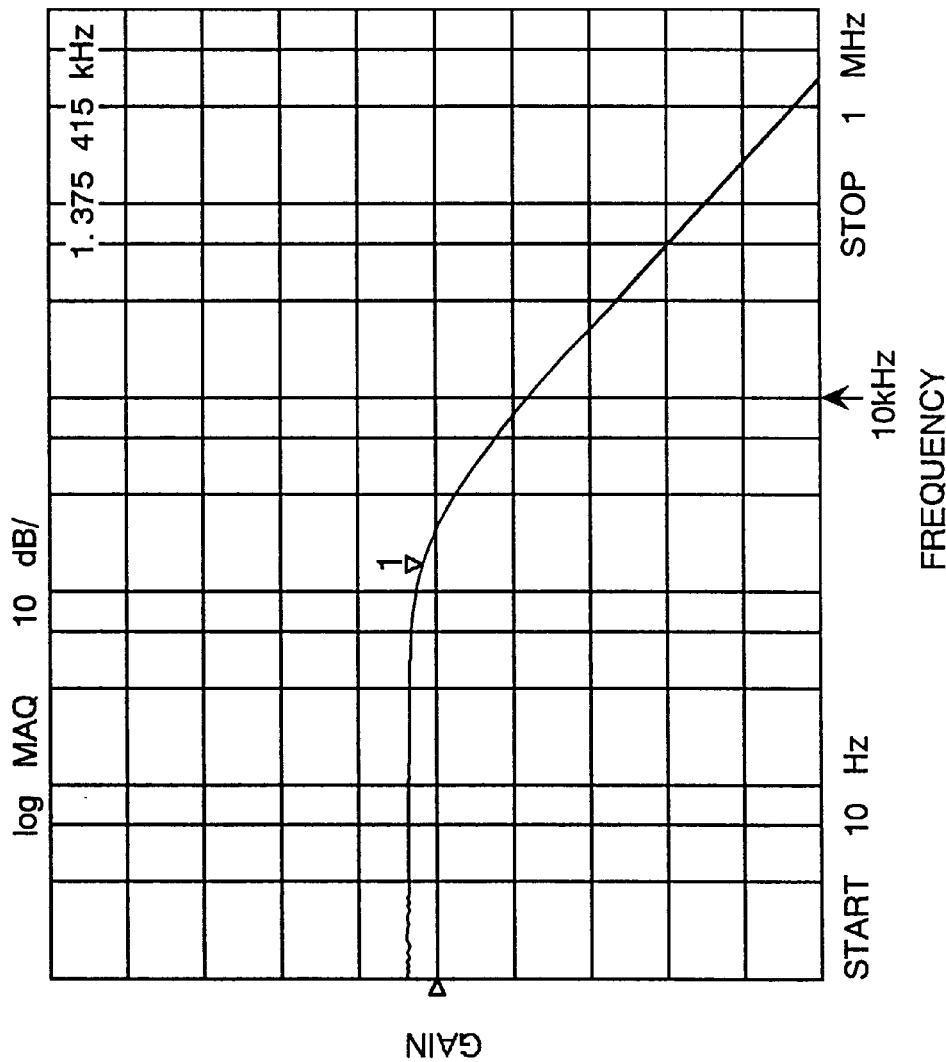
FIG. 8 is a diagram showing a graph representing a frequency response of the gain amplification provided by an exciting light of an erbium-doped optical fiber used in a second embodiment of the invention.

By the way, the exiting unit 6 and the controller 10 can be implemented into a configuration shown in FIG. 6. Reference numeral 23 shown in the figure is an optical switch. A voltage applied to the optical switch 23 is switched by an electrical switching signal generated by an oscillator 24 employed in the controller 10 from one value to another in order to pass on an exciting light generated by the semiconductor laser 16 either to the polarizer 25a or to the polarizer 25b. The polarizers 25a and 25b make the polarized waves of the exciting lights mutually orthogonal and make the orientations of the polarized waves of the exciting lights match those of the polarized waves of the signal lights introduced to the polarization maintaining erbium-doped optical fiber 15. The oscillator 24 employed in the controller 10 oscillates at a fixed frequency of 50 kHz, actuating a switch-over switch 26 at a frequency of 50 kHz as well. The switch-over switch 26 is used for passing on a monitored voltage generated by either the optical detector 19a or 19b to a comparator 27 for comparing the monitored voltage with a reference value 18. As a result, by adopting the configuration shown in FIG. 6, it is possible to control two signal lights with wavelengths different from each other independently of each other by using a single semiconductor laser, allowing the amount of power consumed by the semiconductor laser to be reduced. The operating state of the exciting light in such a configuration is explained by referring to FIG. 7. Reference numeral 29 shown in the figure is a graph representing a model of the power of the exciting light. Reference numeral 30 is a graph representing a model of the power of the exciting light introduced to the polarizer 25a and reference numeral 31 is a graph representing a model of the power of the exciting light introduced to the polarizer 25b. The power of the exciting light is switched from the polarizer 25a to 25b and vice versa at a frequency of 50 kHz so that the monitored voltages output by the light detectors 19a and 19b become equal to the reference value 28. The power of the exciting light is switched from the polarizer 25a to 25b and vice versa by actuating the optical switch 23 shown in FIG. 6 also at a frequency of 50 kHz. The graph 29 is the sum of the graphs 30 and 31. Each peak of the graph 30 coincides with each zero of the graph 31 and, on the contrary, each peak of the graph 31 coincides with each zero of the graph 30. In general, the response speed of the gain amplification provided by an exciting light of an erbium-doped optical fiber converted into a frequency is several kHz. FIG. 8 is a diagram showing a graph representing a measured frequency response provided by an exciting light of an erbium-doped optical fiber employed in the present embodiment. According to the graph shown in the figure, at frequencies higher than 10 kHz, a swept exciting light does not contribute to the gain amplification of a signal light. That is to say, a switching frequency higher than 10 kHz is much sufficiently faster than the response speed of the gain amplification of the erbium-doped optical fiber and, thus, has no bad effect on the control stability. For this reason, the switching frequency in the present embodiment is set at 50 kHz. In the configuration shown in FIG. 6, since the two signal lights having different wavelengths are controlled to the same output level, there is no need to change the reference value 28 even if the oscillator 24 oscillates at a frequency of 50 kHz. If two signal lights having different wavelengths are to be controlled to different output levels, however, the reference value needs to be changed at a frequency of 50 kHz as well.

Figure 9:
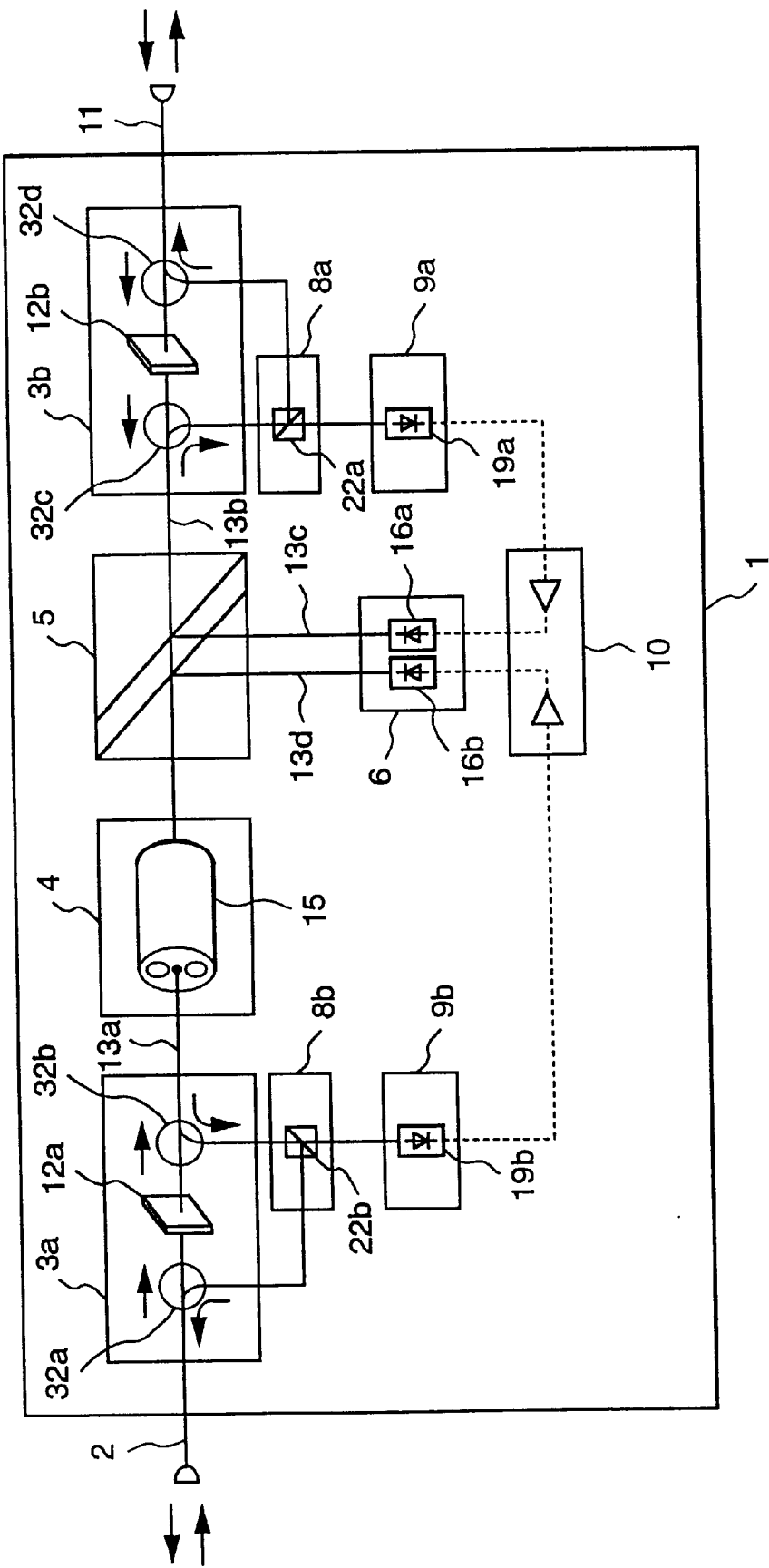
FIG. 9 is a diagram showing a third embodiment implementing an optical amplifier provided by the present invention.

FIG. 9 is a diagram showing a third embodiment implementing an optical amplifier provided by the present invention. The optical amplifier provided by the present invention is used in two-directional transmission in which signal lights are transmitted along a transmission optical fiber in directions opposite to each other. Both the signal lights have a wavelength LAMDA of 1,550 nm. Reference numeral 1 shown in the figure is the optical amplifier provided by the present invention similar to that provided by the first embodiment. As shown in the figure, however, the optical amplifier 1 comprises only one input port 2 and one output port 11 which are each used as both input and output ports for respectively inputting and outputting transmitted signal lights in directions opposite to each other. A signal light input through the input port 2 from the left side is introduced to a polarized-wave identifying/synthesizing unit 3a. In the polarized-wave identifying/synthesizing unit 3a of the present embodiment, the signal light passes through an optical circulator 32a, a polarizer 12a for setting a signal light in a certain polarization state and an optical circulator 32b. The signal light output by the polarized-wave identifying/synthesizing unit 3a is then supplied to a polarization maintaining optical fiber 13a for transmitting a signal light with the polarization state thereof maintained as it is. As shown in the figure, the signal light is then introduced to the left end of a polarization maintaining erbium-doped optical fiber 15 used as a polarization maintaining optical amplifying medium 4 with the polarization state thereof maintained as it is.

By the same token, a signal light input through the output port 11 from the right side is introduced to a polarized-wave identifying/synthesizing unit 3b. In the polarized-wave identifying/synthesizing unit 3b of the present embodiment, the signal light passes through an optical circulator 32d, a polarizer 12b for setting a signal light in a polarization state orthogonal to the polarization state set by the polarizer 12a and an optical circulator 32c. The signal light output by the polarized-wave identifying/synthesizing unit 3b is then supplied to a polarization maintaining optical fiber 13b for transmitting a signal light with the polarization state thereof maintained as it is. As shown in the figure, the signal light is then introduced to the right end of a polarization maintaining erbium-doped optical fiber 15 used as the polarization maintaining optical amplifying medium 4 through the introduction unit 5.

At the same time, exciting lights from semiconductor lasers 16a and 16b serving as the exciting unit 6 are introduced to the right end of the polarization maintaining erbium-doped optical fiber 15 by way of the introduction unit 5. Polarization maintaining optical fibers 13c and 13d and a polarization maintaining optical synthesizer used as the introduction unit 5 make the polarized waves of the exciting lights mutually orthogonal and make the orientations of the polarized waves of the exciting lights match those of the polarized waves of the signal lights introduced from both the ends of the polarization maintaining erbium-doped optical fiber 15. Here, the oscillation wavelength of the semiconductor lasers 16a and 16b is 1.48 microns. It should be noted that the exciting unit 6 can also be connected to the left end of the polarization maintaining erbium-doped optical fiber 15 through the introduction unit 5. As an alternative, exciting units 6 can also be connected to the left and right ends of the polarization maintaining erbium-doped optical fiber 15 each through an introduction unit 5.

The conventional erbium-doped optical fiber is capable of providing a gain amplification degree independent of the polarized wave. None the less, a single erbium-doped optical fiber is not capable of adjusting the amplification degree to different signal components coexisting in the same optical fiber. On the other hand, with the polarization maintaining erbium-doped optical fiber 15 provided by the present invention to serve as the polarization maintaining optical amplifying medium, typically, the exciting light generated by the semiconductor laser 16a contributes only to the excitation amplification of the signal light introduced from the input port 2 while the exciting light generated by the semiconductor laser 16b contributes only to the excitation amplification of the signal light introduced from the output port 11, allowing a mutually independent amplification operations to be carried out. That is to say, the single polarization maintaining erbium-doped optical fiber 15 is capable of adjusting the gain amplification degrees in a completely independent manner for two signal lights with wavelengths different from each other.

In addition, in an optical amplifier employed in the conventional bi-directional transmission, an optical isolator is required for suppressing reflection of signal lights at the input and output connectors. In order to introduce a one-directional light to the optical oscillator, lights traveling in directions opposite to each other must be once separated from each other. As a general method for separating lights traveling in directions opposite to each other, the wavelengths of the lights are changed. According to the polarized-wave identifying/synthesizing units 3a and 3b provided by the present invention, on the other hand, a light reflected by an optical connector can be shielded by the polarizer 12a or 12b. Further, since signal lights traveling in directions opposite to each other can be discriminated from each other by the polarized-wave identifying/synthesizing unit 3a or 3b, the signal lights can have the same wavelength.

In order to utilize the polarization maintaining erbium-doped optical fiber 15 provided by the present invention in a more effective way, it is important that the amount of radiation loss of a light caused by a bent optical fiber be suppressed. As described before, such radiation loss may reduce the gain amplification degrees of the two independent signal lights. For this reason, in the present embodiment, the diameter of curvature of the polarization maintaining erbium-doped optical fiber 15 is made no smaller than 300 mm as is the case with the first and second embodiments.

After the signal light introduced from the left end of the polarization maintaining erbium-doped optical fiber 15 leaves the right end of the polarization maintaining erbium-doped optical fiber 15, the signal light is supplied to the polarized-wave identifying/synthesizing unit 3b by way of the introduction unit 5. As shown in the figure, in the polarized-wave identifying/synthesizing unit 3b, the signal light exits the optical circulator 32c through an exit different from an entrance through which the signal light from the output port 11 is introduced to the optical circulator 32c, entering a 5:95 polarization maintaining optical coupler 22a used as a branching means 8a. Most of the signal light leaving the 5:95 polarization maintaining optical coupler 22a is output to the output port 11 of the optical amplifier by way of the optical circulator 32d. However, some of the signal light branches at the 5:95 polarization maintaining optical coupler 22a, entering an optical receiver 19a which serves as the optical detection unit 9a for detecting the power of the signal light. The detected power of the light is supplied to the controller 10 for controlling the output power of the semiconductor laser 16a so that the signal light is maintained at a predetermined level.

By the same token, after the signal light introduced from the right end of the polarization maintaining erbium-doped optical fiber 15 leaves the left end of the polarization maintaining erbium-doped optical fiber 15, the signal light is supplied to the polarized-wave identifying/synthesizing unit 3a by way of the introduction unit 5. As shown in the figure, in the polarized-wave identifying/synthesizing unit 3a, the signal light exits the optical circulator 32b through an exit different from an entrance through which the signal light from the input port 2 is introduced to the optical circulator 32b, entering a 5:95 polarization maintaining optical coupler 22b used as a branching means 8b. Most of the signal light leaving the 5:95 polarization maintaining optical coupler 22b is output to the input port 2 of the optical amplifier by way of the optical circulator 32a. However, some of the signal light branches at the 5:95 polarization maintaining optical coupler 22b, entering an optical receiver 19b which serves as the optical detection unit 9b for detecting the power of the signal light. The detected power of the light is supplied to the controller 10 for controlling the output power of the semiconductor laser 16b so that the signal light is maintained at a predetermined level.

Here, signal lights having polarized waves orthogonal to each other can be introduced to the input and output ports 2 and 11.

According to the present embodiment, signal lights traveling in directions opposite to each other can be controlled by using an optical amplifier having a simple configuration, the stability and reliability of the system as a whole to be increased.

By the way, the exiting unit 6 and the controller 10 can be implemented into a configuration shown in FIG. 6.

As described above, the present invention can be applied to a wide range of optical transmission systems wherein high expandability, high stability and high reliability are all to be achieved at the same time at a low cost. An example of such an optical transmission system is shown in FIG. 10.

As shown in the figure, a light transmitting unit 44 comprises light transmitters 46a, 46b and 46c. Lights output by the light transmitters 46a, 46b and 46c are multiplexed in the light transmitting unit 44 before being transmitted to an optical amplifier 1 through a transmission line 43. After being amplified by the optical amplifier 1, the multiplexed signal lights are transmitted to a light receiving unit 45 through another transmission line 43. In the light receiving unit 45, the multiplexed signal lights are demultiplexed into the original independent signal lights to be received by their respective light receivers 47a, 47b and 47c.

A signal light can be transmitted through the transmission lines 43 in either direction. In addition, either multiplexed signal lights or a single signal light can be transmitted through the transmission lines 43. In the case of a transmission line 43 with a big amount of transmission loss, a plurality of optical amplifiers 1 can be placed at discrete locations along the transmission line 43 in series. Further, instead of a single transmission line 43, a plurality of transmission lines 43 can be used for building up a parallel transmission system. In this case, it is needless to say that an optical amplifier 1 with a plurality of input/output ports can be employed as is obvious from the description of the embodiments given so far.

According to the present invention, a signal light can be transmitted through an optical amplifier provided on a transmission line in either direction.

If a transmission line on the right side of an optical amplifier is longer than a transmission on the left side of the optical amplifier, a signal light coming through the transmission line on the right side incurs more loss than the transmission on the left side. In such a case, however, since the optical amplifier provided by the present invention is capable of adjusting the gain amplification degrees of the individual signal lights in different directions independently of each other, the design flexibility and expandability of design parameters such as gain distribution required in a design process of the transmission system can be enhanced.

As described above, according to the present invention, it is possible to provide an optical amplifier capable of carrying out individual control of a plurality of signal lights, with their polarization states discriminatable from each other, independently of each other. In addition, it is also possible to provide an optical amplifier which, by controlling a plurality of signal lights, with their polarization states discriminatable from each other, independently of each other, allows the system cost required for increasing the number of system series to be reduced.

Further, it is possible to provide a simple and efficient optical amplifier using a polarization maintaining optical amplifying medium.

Furthermore, it is also possible to provide an optical amplifier capable of keeping up with variations along the time axis occurring in individual signal lights independently of each other.

Moreover, it is also possible to provide an optical amplifier which, by considering the wavelength dependence observed in the gains of wavelength-division-multiplexed signal lights, allows the output of a signal light having a single wavelength to be controlled independently.

In addition, it is possible to provide an optical transmission system which, by carrying out mutually independent control of a plurality of signal lights, with their polarization states discriminatable from each other, independently of each other by using a single optical amplifier, allows the system cost to be reduced and the relay-transmission distance to be increased.

Further, it is possible to provide an optical amplifier which, by carrying out individual control of a plurality of signal lights transmitted in both directions, with their polarization states discriminatable from each other, independently of each other, allows the system cost to be reduced.

Further, it is possible provide an optical amplification method capable of carrying out individual control of a plurality signal lights transmitted through a plurality of transmission lines, with their polarization states discriminatable from each other, independently of each other.

What is claimed is:

1. An optical amplifier which amplifies a first signal light in a first polarization state and a second signal light in a second polarization state different from said first polarization state, said optical amplifier comprising:
   a polarization maintaining optical amplifying medium which receives said first and second signal lights and amplifies said first and second signal lights while maintaining said first and second polarization states thereof; and
   an exciting unit which is used for providing first and second exciting lights having polarization states corresponding to said first and second signal lights respectively so that said polarization maintaining optical amplifying medium is capable of selectively amplifying said first and second signal lights.

2. An optical amplifier according to claim 1, wherein said polarization maintaining optical amplifying medium is a polarization maintaining rare earth-doped optical fiber having a polarized-wave-dependent characteristic.

3. An optical amplifier according to claim 2, wherein said first and second exciting lights from said exciting unit are switched from one to another on a time axis in order to independently assign said first and second exciting lights to said first and second signal lights respectively.

4. An optical amplifier according to claim 3, wherein said first and second exciting lights are switched from one to another on said time axis at a frequency of 10 kHz or higher.

5. An optical amplifier which amplifies a first signal light in a first polarization state and a second signal light in a second polarization state different from said first polarization state, said optical amplifier comprising:
   a polarization maintaining optical amplifying medium which receives said first and second signal lights and amplifies said first and second signal lights while maintaining said first and second polarization states thereof;
   an exciting unit which provides first and second exciting lights having polarization states corresponding to said first and second signal lights respectively; and
   an optical coupler which couples said first and second exciting lights to said polarization maintaining optical amplifying medium so that said polarization maintaining optical amplifying medium is capable of selectively amplifying said first and second signal lights.

6. An optical amplifier according to claim 5, wherein said polarization maintaining optical amplifying medium is a polarization maintaining rare earth-doped optical fiber having a polarized-wave-dependent characteristic.

7. An optical amplifier according to claim 6, wherein the first and second exciting lights from said exciting unit are switched from one to another on a time axis in order to independently assign said first and second exciting lights to said first and second signal lights respectively.

8. An optical amplifier according to claim 7, wherein said first and second exciting lights are switched from one to another on said time axis at a frequency of 10 kHz or higher.

9. A bi-directional optical amplifier which amplifies a first signal light in a first polarization state and a second signal light in a second polarization state different from said first polarization state, said bi-directional optical amplifier comprising:
   a polarization maintaining optical amplifying medium which receives said first and second signal lights and amplifies said first and second signal lights while maintaining said first and second polarization states thereof; and
   an exciting unit which is used for providing first and second exciting lights having polarization states corresponding to said first and second signal lights respectively so that said polarization maintaining optical amplifying medium is capable of selectively amplifying said first and second signal lights.

10. A bi-directional optical amplifier according to claim 9, wherein said polarization maintaining optical amplifying medium is a polarization maintaining rare earth-doped optical fiber having a polarized-wave-dependent characteristic.

11. A bidirectional optical amplifier according to claim 10, wherein said first and second exciting lights from said exciting unit are switched from one to another on a time axis in order to independently assign said first and second exciting lights to said first and second signal lights respectively.

12. A bi-directional optical amplifier according to claim 11, wherein said first and second exciting lights are switched from one to another on said time axis at a frequency of 10 kHz or higher.

13. A bi-directional optical amplifier according to claim 9, wherein a wavelength of said first signal light is substantially equal to a wavelength of said second signal light.

* * * * *